US009341147B2

(12) United States Patent
Jentz et al.

(10) Patent No.: US 9,341,147 B2
(45) Date of Patent: May 17, 2016

(54) ENGINE-OFF REFUELING DETECTION METHOD

(71) Applicant: Ford Global Technologies, LLC, Dearborn, MI (US)

(72) Inventors: Robert Roy Jentz, Westland, MI (US); Mark W. Peters, Wolverine Lake, MI (US); Dave Clemens, Canton, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 506 days.

(21) Appl. No.: 13/788,624

(22) Filed: Mar. 7, 2013

(65) Prior Publication Data

US 2014/0257668 A1 Sep. 11, 2014

(51) Int. Cl.

| | |
|---|---|
| ***G01M 3/04*** | (2006.01) |
| ***F02M 25/08*** | (2006.01) |
| *F02D 41/00* | (2006.01) |

(52) U.S. Cl.

CPC ....... *F02M 25/0809* (2013.01); *F02M 25/0818* (2013.01); *F02D 41/0032* (2013.01); *F02M 25/0827* (2013.01)

(58) Field of Classification Search

CPC .......... F02M 25/0809; F02M 25/0818; F02M 25/0827; F02D 41/0032

USPC ............ 123/516–520; 73/40, 114.38, 114.39, 73/114.77

See application file for complete search history.

(56) References Cited

U.S. PATENT DOCUMENTS

| | | | | |
|---|---|---|---|---|
| 4,791,805 | A * | 12/1988 | Gates | 73/40.7 |
| 5,542,394 | A | 8/1996 | Tomisawa | |
| 5,572,981 | A * | 11/1996 | Pfleger et al. | 123/698 |
| 5,911,209 | A * | 6/1999 | Kouda et al. | 123/520 |
| 6,301,955 | B1 * | 10/2001 | Cook et al. | 73/49.7 |
| 6,536,261 | B1 * | 3/2003 | Weldon et al. | 73/49.7 |
| 6,557,534 | B2 * | 5/2003 | Robichaux et al. | 123/520 |
| 6,761,154 | B2 * | 7/2004 | Takagi et al. | 123/520 |
| 6,837,224 | B2 * | 1/2005 | Kidokoro et al. | 123/520 |
| 6,880,534 | B2 * | 4/2005 | Yoshiki et al. | 123/520 |
| 6,950,742 | B2 * | 9/2005 | Yamaguchi et al. | 701/114 |
| 6,951,126 | B2 * | 10/2005 | Perry et al. | 73/49.7 |
| 6,965,825 | B2 * | 11/2005 | Hosoya et al. | 701/114 |
| 6,988,396 | B2 * | 1/2006 | Matsubara et al. | 73/114.39 |

(Continued)

FOREIGN PATENT DOCUMENTS

GB 2291865 A * 2/1996

OTHER PUBLICATIONS

Dudar, Aed M. et al., "Method and System for Fuel Vapor Control," U.S. Appl. No. 13/612,359, filed Sep. 12, 2012, 43 pages.

*Primary Examiner* — Joseph Dallo

(74) *Attorney, Agent, or Firm* — James Dottavio; Alleman Hall McCoy Russell & Tuttle LLP

(57) ABSTRACT

A method for an engine fuel system comprises, during an engine-off condition, indicating a refueling event based on a rate of change in fuel tank pressure, and aborting a diagnostic leak detection test based on the refueling event indication. Indicating a refueling event further comprises indicating a refueling event based on the rate of change in fuel tank pressure being greater than a first threshold when the canister vent valve is open, and greater than a second threshold when the canister vent valve is closed, the first threshold being less than the second threshold.

18 Claims, 4 Drawing Sheets

(56) References Cited

U.S. PATENT DOCUMENTS

| | | | | |
|---|---|---|---|---|
| 7,005,975 | B2 * | 2/2006 | Lehner | 340/438 |
| 7,032,580 | B2 * | 4/2006 | Suzuki | 123/568.21 |
| 7,036,359 | B2 * | 5/2006 | Hayakawa et al. | 73/114.39 |
| 7,043,972 | B2 * | 5/2006 | Matsubara et al. | 73/114.39 |
| 7,073,376 | B2 * | 7/2006 | Hassdenteufel et al. | 73/114.39 |
| 7,077,112 | B2 * | 7/2006 | Mitani et al. | 123/518 |
| 7,086,392 | B2 * | 8/2006 | Suzuki | 123/698 |
| 7,152,587 | B2 * | 12/2006 | Suzuki | 123/518 |
| 7,174,883 | B2 * | 2/2007 | Sonoda et al. | 123/586 |
| 7,204,239 | B2 * | 4/2007 | Iriyama | 123/520 |
| 7,347,191 | B2 * | 3/2008 | Atwood et al. | 123/516 |
| 7,472,582 | B2 * | 1/2009 | Ito et al. | 73/49.7 |
| 7,523,744 | B2 * | 4/2009 | Ayame | 123/491 |
| 8,019,525 | B2 | 9/2011 | DeBastos et al. | |
| 2003/0062210 | A1 * | 4/2003 | Farmer | 180/286 |
| 2003/0075156 | A1 * | 4/2003 | Morinaga et al. | 123/520 |
| 2006/0185423 | A1 * | 8/2006 | Mc Lain et al. | 73/49.7 |
| 2007/0068227 | A1 * | 3/2007 | Tsuyuki et al. | 73/49.7 |
| 2009/0107441 | A1 * | 4/2009 | Husak et al. | 123/179.16 |
| 2009/0150041 | A1 * | 6/2009 | Hill et al. | 701/102 |
| 2010/0288367 | A1 * | 11/2010 | Pursifull | 137/2 |
| 2010/0312459 | A1 * | 12/2010 | Utsumi | 701/106 |
| 2010/0318279 | A1 * | 12/2010 | Meyer et al. | 701/103 |
| 2011/0132306 | A1 * | 6/2011 | Kerns et al. | 123/1 A |
| 2011/0139130 | A1 * | 6/2011 | Siddiqui | 123/520 |
| 2011/0166765 | A1 * | 7/2011 | DeBastos et al. | 701/102 |
| 2011/0168140 | A1 * | 7/2011 | DeBastos et al. | 123/521 |
| 2011/0265768 | A1 * | 11/2011 | Kerns et al. | 123/521 |
| 2011/0295482 | A1 * | 12/2011 | Pearce et al. | 701/102 |
| 2012/0211087 | A1 | 8/2012 | Dudar et al. | |

* cited by examiner

ENGINE-OFF REFUELING DETECTION METHOD

FIELD

The present description relates to systems and methods for operation and diagnostics of on-board fuel vapor recovery systems.

BACKGROUND AND SUMMARY

Evaporative emission (EVAP) system diagnostic leak detection tests that monitor fuel system pressure and/or vacuum have been used. EVAP diagnostic leak detection tests may be conducted during engine-off conditions because fuel system pressure disturbances, such as fuel slosh, arising from regular vehicle operation may be absent. A typical diagnostic leak detection test may seal the EVAP system by closing the canister vent valve (CVV) and then monitor changes in fuel system vacuum and/or pressure to determine system integrity when the engine is off. However, if refueling is started during an engine-off diagnostic leak detection test, the ensuing increase in fuel system pressure due to the dispensed fuel may confound the results of the diagnostic leak detection test. Furthermore, the buildup in fuel system pressure may prematurely shutoff the fuel dispensing pump.

Tomisawa (U.S. Pat. No. 5,542,394) discloses a vehicle engine refueling detection apparatus that detects a refueling event when the engine is off, and when a fuel tank pressure is greater than or equal to a predetermined value.

The inventors herein have recognized potential issues with the above approach. Namely, the method does not account for refueling during engine-off conditions when a diagnostic leak detection test is being performed. In particular, if the CVV (or another device that restricts fluid flow in the system) is closed to perform a diagnostic leak detection test, then an increase in fuel tank pressure due to a refueling event may be greater than when the CVV is open. Furthermore, if the fuel tank pressure signal is noisy, for example, due to a faulty sensor, a false refueling event may be detected.

One approach for at least partially addressing the aforementioned issues is a method of indicating a refueling event comprising during an engine-off condition, indicating a refueling event based on a rate of change in fuel tank pressure, and aborting a diagnostic leak detection test based on the refueling event indication. In particular, the refueling event indication may be based on the rate of change in fuel tank pressure being greater than a first threshold when the canister vent valve is open, and greater than a second rate of change in fuel tank pressure when the canister vent valve is closed, the first threshold being less than the second threshold. In this way, reliability in indicating a refueling event can be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
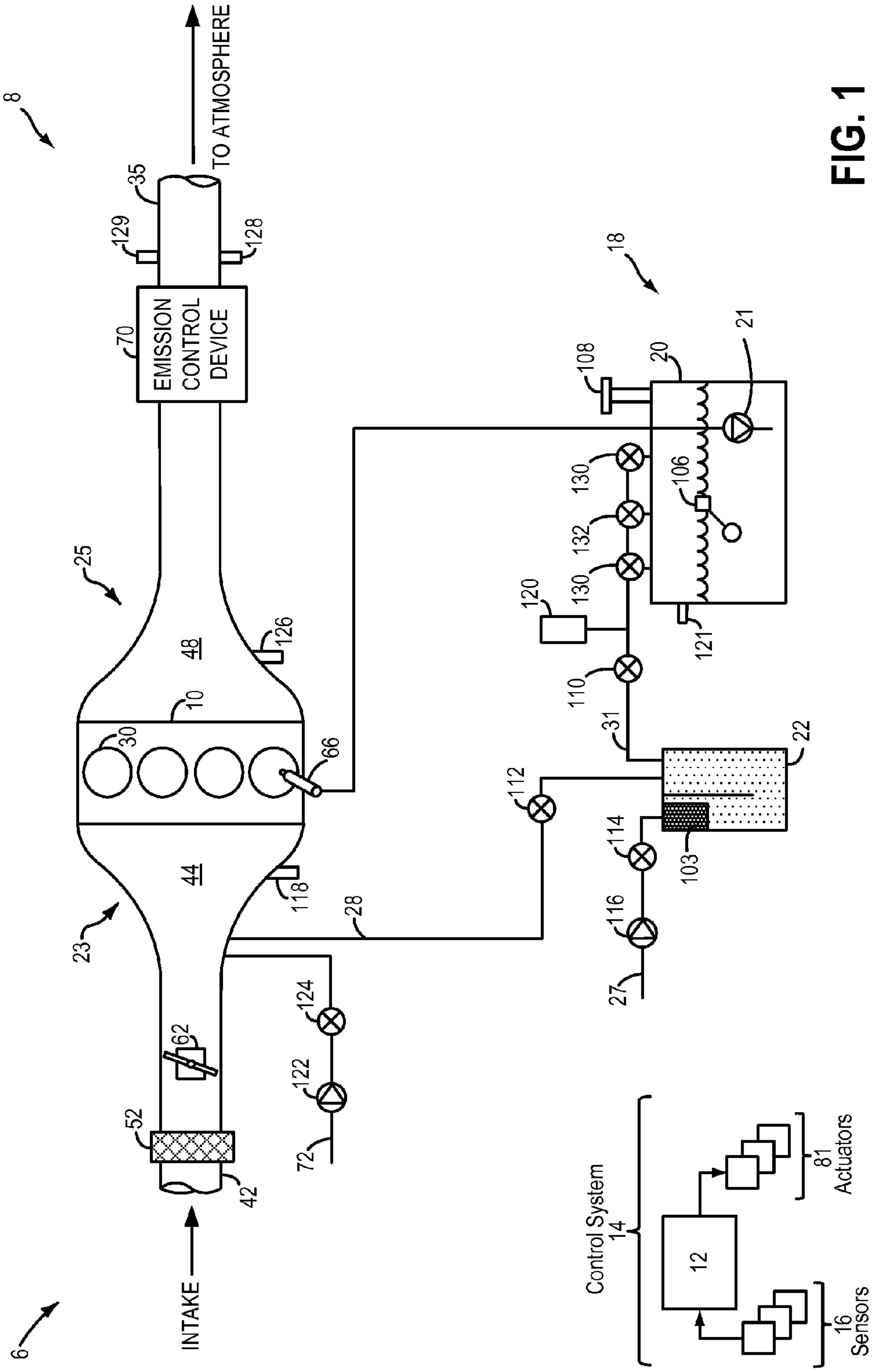
FIG. 1 shows a schematic depiction of an engine and an associated fuel system.
Figure 3:
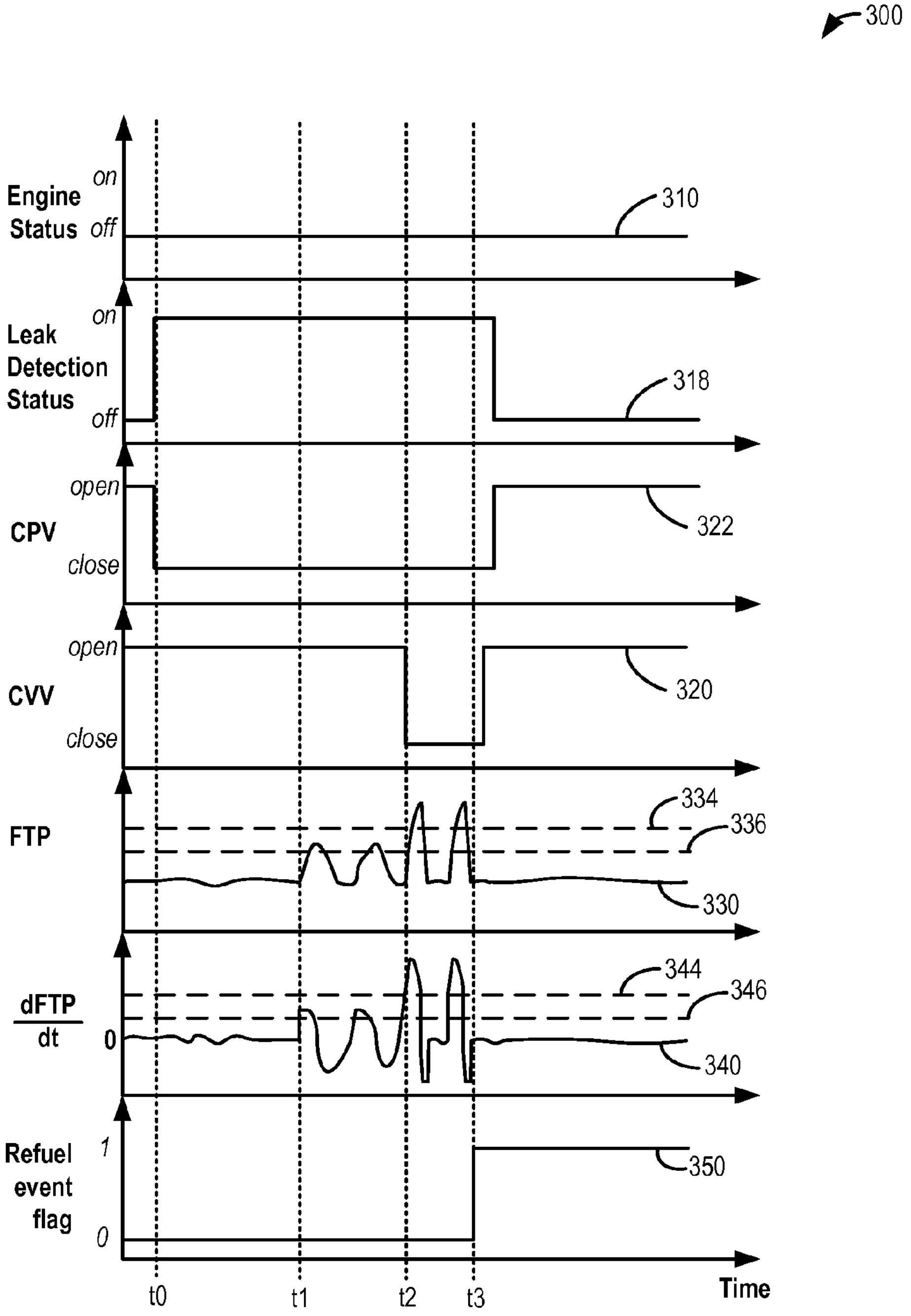
FIG. 3 shows an example timeline
Figure 4:
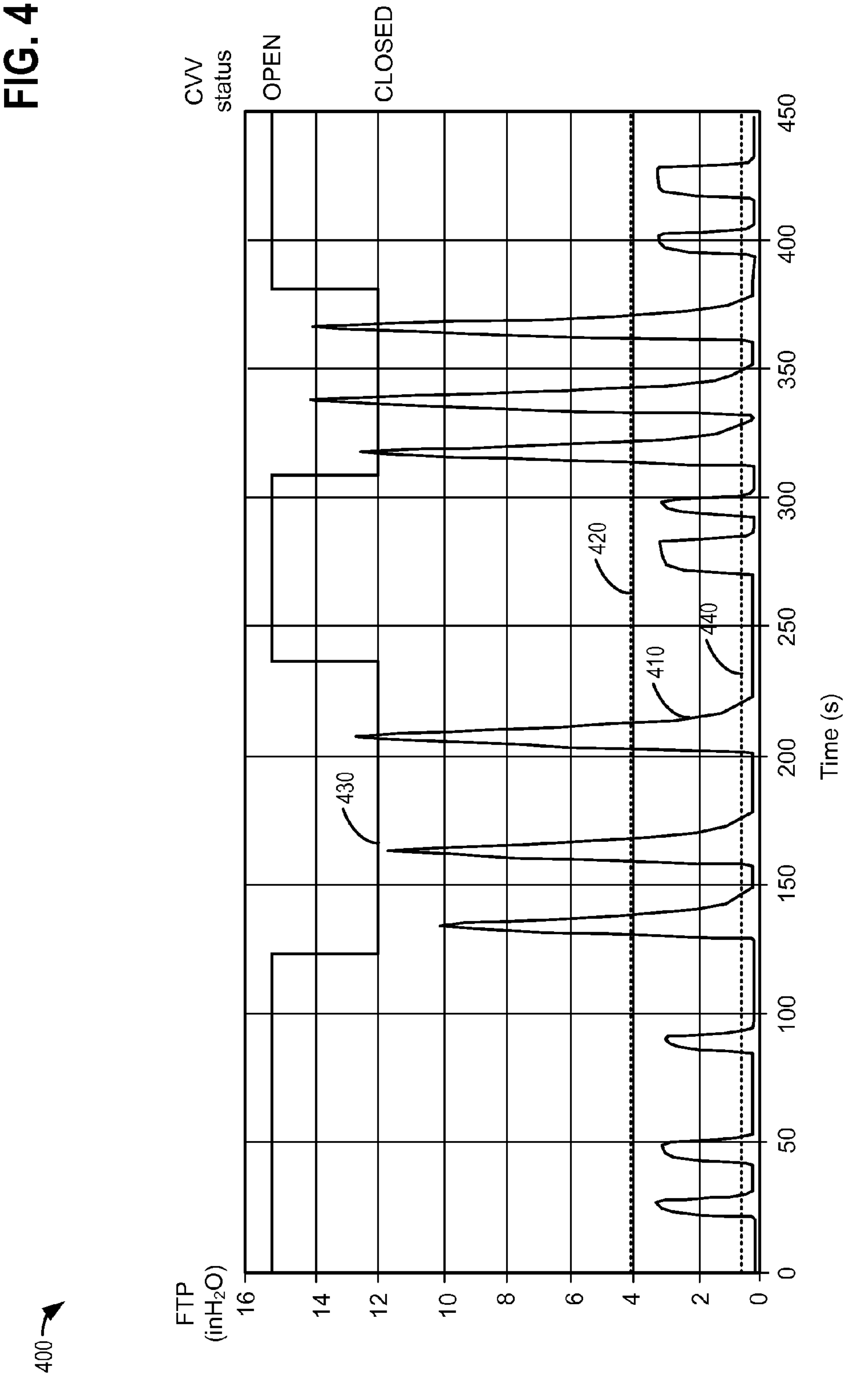
FIG. 4 illustrates an example plot of fuel tank pressure and CVV status.

Methods and systems are described for indicating a refueling event during engine-off conditions while a diagnostic leak detection test is being performed in a vehicle with a fuel system as depicted in FIG. 1. A controller may be configured to perform a control routine, such as the method of FIG. 2 in order to detect a refueling event when an engine-off diagnostic leak detection test is being performed. An example timeline for operation of vehicle comprising a fuel system for detecting a refueling event during engine-off diagnostic leak detection testing is shown in FIG. 3, and an example plot of fuel tank pressure and CVV status during refueling are shown in FIG. 4.

FIG. 1 shows a schematic depiction of a hybrid or other vehicle system 6 that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein.

In some embodiments, engine 10 may be a boosted engine wherein the engine intake includes a boosting device, such as a turbocharger. When included, a turbocharger compressor may be configured to draw in intake air at atmospheric air pressure and boost it to a higher pressure. The turbocharger compressor may be driven by the rotation of an exhaust turbine, coupled to the compressor by a shaft, the turbine spun by the flow of exhaust gases there-through.

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling door 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example fuel injector 66. While only a single fuel injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated (e.g., canister load is higher than a threshold), hydrocarbons stored in fuel vapor canister 22 may be purged to engine intake 23 by opening canister purge valve (CPV) 112 and CVV 114. CPV 112 and CVV 114 may be solenoid valves, or variable pulse width modulated solenoid valves that are controlled by the control system 14. While a single canister 22 is shown, it will be appreciated that fuel system 18 may include any number of canisters.

Canister 22 may include a buffer 103 (or buffer region), each of the canister and the buffer comprising the adsorbent. As shown, the volume of buffer 103 may be smaller than (e.g., a fraction of) the volume of canister 22. The adsorbent in the buffer 103 may be same as, or different from, the adsorbent in the canister (e.g., both may include charcoal). Buffer 103 may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing any fuel vapor spikes from going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and CPV 112. While this example shows vent 27 communicating with fresh, unheated air, various modifications may also be used. Vent 27 may include CVV 114 to adjust a flow of air and vapors between canister 22 and the atmosphere. CVV 114 may also be used for diagnostic routines such as diagnostic leak detection testing. CVV 114 may be opened during fuel vapor storing operations (for example, during fuel tank refueling and while the engine is not running) so that air, stripped of fuel vapor after having passed through the canister 22, can be pushed out to the atmosphere. Likewise, during purging operations (for example, during canister regeneration and while the engine is running), CVV 114 may be opened to allow a flow of fresh air to strip the fuel vapors stored in the canister 22.

During canister purging operation, the timing of closing the CVV 114 and the CPV 112 may be adjusted towards the end of the purging operation to hold at least some vacuum in the tank. Specifically, the CVV 114 may be closed before the CPV 112 is closed so that fuel system vacuum is maintained in between purge operations. This allows a subsequent canister purge operation to be initiated with the fuel tank 20 under negative pressure, enabling flow through the canister bed to be the path of least resistance. This may not only achieve increased purging of the canister bed but may also reduce drawing of fuel tank vapors from the fuel tank vapor dome directly into the engine intake, while bypassing the canister bed.

As such, hybrid vehicle system 6 may have reduced engine operation times due to the vehicle being powered by engine system 8 during some conditions, and by the energy storage device (e.g., a battery) under other conditions. While the reduced engine operation times reduce overall carbon emissions from the vehicle, they may also lead to insufficient or incomplete purging of fuel vapors from the vehicle's emission control system. In some embodiments, to address this issue, vapor blocking valve 110 (or VBV) may be optionally included in conduit 31 between fuel tank 20 and canister 22. In some embodiments, vapor blocking valve 110 may be a solenoid valve wherein operation of the valve is regulated by adjusting a driving signal (or pulse width) of the dedicated solenoid.

During regular engine operation, VBV 110 may be kept closed to limit the amount of diurnal vapors directed to canister 22 from fuel tank 20. During refueling operations, and selected purging conditions, VBV may be opened to direct fuel vapors from the fuel tank 20 to canister 22. By opening the valve during conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows VBV 110 positioned along conduit 31, in alternate embodiments, the isolation valve may be mounted on fuel tank 20. While the vapor blocking valve is said to open to relieve fuel tank over-pressure (e.g., opened when fuel tank pressure is higher than a threshold pressure and below atmospheric pressure), in still other embodiments, fuel tank 20 may also be constructed of material that is able to structurally withstand high fuel tank pressures, such as fuel tank pressures that are higher than the threshold pressure and below atmospheric pressure.

One or more pressure sensors such as fuel system sensor 120 may be coupled to fuel tank 20 for estimating a fuel tank pressure or vacuum level. While the depicted example shows fuel system sensor 120 coupled between the fuel tank and VBV 110 along conduit 31, in alternate embodiments, the pressure sensor may be coupled directly to fuel tank 20, as in fuel tank pressure sensor 121. In still other embodiments, a first pressure sensor may be positioned upstream of the vapor blocking valve, while a second pressure sensor is positioned downstream of the vapor blocking valve, to provide an estimate of a pressure difference across the valve.

Fuel system 18 may further include fuel limit vent valve (FLVV) 132 and one or more fuel vapor control valves (FVV) 130 connected to fuel tank 20. FLVV 132 and FVVs 130 may prevent overfilling of the fuel tank 20, prevent liquid fuel from flowing to the canister 22 due to fuel slosh during severe driving or vehicle rollover conditions, and also control the flow of fuel vapors to the canister 22.

Vent 27 may further include a vacuum pump 116. Vacuum pump 116 may be used for lowering the pressure in the canister 22, for example, during diagnostic leak detection testing. Vacuum pump 116 may further be used for lowering the pressure in fuel tank 20 and conduit 31 when a vapor blocking valve 110 and refueling door 108 are closed respectively. As an alternative, vacuum pump 116 may also be coupled to the fuel tank 20 or conduit 31 for lowering the pressure of the fuel system. When vacuum pump 116 is coupled to the fuel tank 20 or conduit 31, vacuum may be applied to fuel system via vacuum pump 116 without opening CVV 114.

An additional vent line 72 may be included at engine intake manifold 44. Vent line 72 may comprise a vent line valve 124 and vacuum pump 122. Vent line valve 124 may be opened and vacuum pump 122 may be turned on in order to lower the pressure in engine intake manifold 44. For example, if the canister purging is started when the intake manifold vacuum is low (e.g., due to turbocharging), then vacuum pump 122 may be used to draw a vacuum in engine intake manifold 44 so that fuel vapors can be drawn from canister 22 to engine intake manifold. As another example, the vacuum pump 122 may be used to lower the pressure in the engine intake manifold 44 when performing diagnostic leak detection testing when the engine is on.

Fuel vapors released from canister 22, for example during a purging operation, may be directed into engine intake manifold 44 via purge line 28. The flow of vapors along purge line 28 may be regulated by CPV 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake.

An optional canister check valve (not shown) may be included in purge line 28 to prevent intake manifold pressure from flowing gases in the opposite direction of the purge flow. As such, the check valve may be used if the canister purge valve control is not accurately timed or the canister purge valve itself can be forced open by a high intake manifold pressure. An estimate of the manifold absolute pressure (MAP) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel recovery system 7 and fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open vapor blocking valve (VBV) 110 and CVV 114 while closing CPV 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open vapor blocking valve 110 and CVV 114, while maintaining CPV 112 closed, to depressurize the fuel tank before allowing enabling fuel to be added therein. As such, vapor blocking valve 110 may be kept open during the refueling operation to allow refueling vapors to be stored in the canister. After refueling is completed, the vapor blocking valve and the canister vent valve may be closed.

As yet another example, the fuel system may be operated in a canister purging mode (e.g., after an emission control device light-off temperature has been attained and with the engine running), wherein the controller 12 may open CPV 112 and CVV 114 sequentially, with CPV 112 opened before the canister vent valve is opened. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister (herein also referred to as the canister load) is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Controller 12 may also be configured to intermittently perform leak detection routines on fuel system 18 (e.g., fuel vapor recovery system) to confirm that the fuel system is not degraded. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value).

In one example, to perform an engine-on leak test, negative pressure generated at engine intake 23 is applied on the fuel system with CVV 114 closed until a threshold level is reached. Alternately, if the intake engine manifold vacuum is low (e.g., due to turbocharging, or low engine speeds), vent line valve 124 may be opened and vacuum pump 122 may be used to apply vacuum to the fuel system. Then, the fuel system is isolated from the engine intake, for example by closing canister purge valve 28, and a rate of vacuum bleed-up is monitored. Based on the rate of change in fuel system vacuum, a fuel system leak can be identified. In another example, where at least some negative pressure is held in the fuel system (such as at the fuel tank) before purging is stopped (via timed closing of CVV 114 prior to stopping the canister purge and closing CPV 112), the fuel system vacuum may be advantageously used during non-purging conditions to identify a fuel system leak. Specifically, the fuel tank vacuum/pressure may be monitored during the non-purging conditions and a leak may be determined based on the rate at which the fuel tank pressure bleeds up from the vacuum conditions to barometric pressure. Herein, by using the existing fuel tank vacuum to assess for leaks during non-purging conditions, the use of an auxiliary or dedicated vacuum source for performing leak detection routines is decreased. In addition, by performing the leak detection using the existing fuel system vacuum during non-purging conditions, completion of the leak detection routine in the limited engine running time available on hybrid vehicles may be more consistently achieved.

When included, vapor blocking valve 110 may be maintained closed during the leak detection routine to allow the negative pressure of the fuel system to be monitored. However, in embodiments where an alternate source of negative pressure is used to perform the leak detection, the vapor blocking valve may be opened to allow the corresponding negative or positive pressure to be applied on the fuel tank.

During engine-off conditions, CPV 112 may be closed and CVV 114 may be open or closed. A diagnostic leak detection test may be performed during engine-off conditions by monitoring the fuel tank pressure and/or the rate of change in fuel tank pressure over a predetermined period. CVV 114 may be closed during the predetermined period in order to isolate the fuel system during pressure and/or vacuum monitoring. Alternately, CVV 114 may be opened, for example momentarily opened for adjusting the fuel system pressure prior to pressure and/or vacuum monitoring. The fuel system pressure may increase or decrease after the engine is shut off during diagnostic leak detection testing. For example, if the vehicle is parked outdoors during hot and sunny weather, the fuel tank pressure may increase during engine-off conditions. As another example, if a warm vehicle is parked in garage or in cold wintry weather, the fuel tank pressure may decrease during engine-off conditions. Furthermore, when performing the diagnostic leak detection test, the change in fuel tank pressure or rate of change in fuel tank pressure may be greater when CVV 114 (or another device that restricts fluid flow in the fuel system) is closed as compared to when CVV 114 is opened.

To abort an engine-off diagnostic leak detection test or when the engine-off diagnostic leak detection test is complete, CPV 112 may be opened, fluidly connecting the fuel system to the engine intake. Furthermore, CVV 114 (or another device that restricts fluid flow in the fuel system) may alternately or also be opened, for example if a refueling event is detected while the diagnostic leak detection test is being carried out, so that air can be purged from the fuel system as fuel is dispensed into the fuel tank 20. By opening CVV 114, the increase in fuel system pressure is reduced during refueling, and the risk of prematurely stopping the refueling is decreased. Furthermore, if an engine-off diagnostic leak detection test is aborted, an indication may be provided to the vehicle control system 14. For example, a diagnostic leak detection test abortion flag may be set and/or a diagnostic leak detection test status flag may be set to off. Further still, if a diagnostic leak detection test is aborted in response to a refuel event, a refuel event flag may be set. Providing an indication to the vehicle control system 14 that a diagnostic leak detection test is aborted may prompt the controller 12 to repeat the diagnostic leak detection test. As an example, if a diagnostic leak detection test is aborted, for example due to a refueling event, controller 12 may repeat or restart the diagnostic leak detection test when refueling is completed, or after a predetermined wait time.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, exhaust temperature sensor 128, fuel system sensor 120, fuel tank pressure sensor 121, and exhaust pressure sensor 129. Other sensors such as additional pressure, temperature, air/fuel ratio, and composition sensors may be coupled to various locations in the vehicle system 6. As another example, the actuators may include fuel injector 66, vapor blocking valve 110, CPV 112, CVV 114, vent line valve 124, and intake throttle 62. The control system 14 may include a controller 12. The controller may receive input data from the various sensors, process the input data, and trigger the actuators in response to the processed input data based on instruction or code programmed therein corresponding to one or more routines. An example control routine is described herein with regard to FIG. 2.

Figure 2:
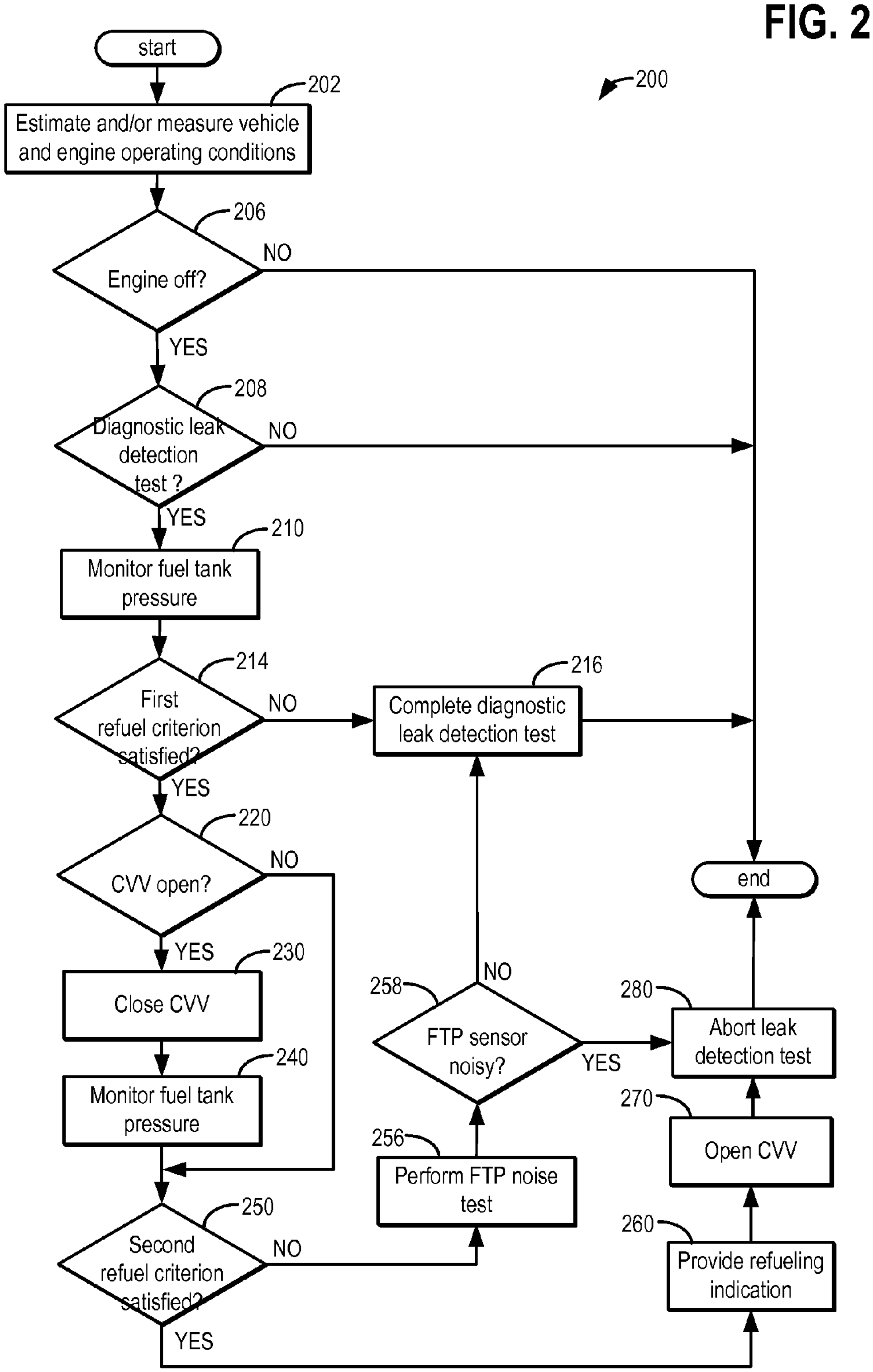
FIG. 2 shows an example flow chart of a method for indicating a refueling event.

Turning now to FIG. 2, it illustrates an example method 200 for detecting a refueling event during engine-off conditions during a diagnostic leak detection test. Method 200 begins at 202 where vehicle engine operating conditions such as engine status, diagnostic leak detection test status, CVV 114 status, and the like are estimated and/or measured. After determining vehicle engine operating conditions, method 200 continues at 206 where it is determined if the engine is off. If the engine is on, then method 200 ends. Otherwise, if the engine is off, method 200 continues at 208 where it determines if a diagnostic leak detection test is being performed. If a diagnostic leak detection test is not being performed, then method 200 ends.

If diagnostic leak detection testing is on, method 200 continues at 210 where it monitors the fuel tank pressure (FTP). Monitoring FTP may include receiving signals from fuel tank pressure sensor 121 over a predetermined time interval such that a predetermined number of fuel tank pressure measurements can be performed. The predetermined number of fuel tank pressure measurements and the predetermined time interval may be set depending on noise characteristic of the sensor and/or fuel tank pressure signal. For example, the predetermined time interval may be 30 seconds or a minute, or long enough to collect a reliable number of pressure measurements representative of the FTP dynamics typically observed during refueling (see FIG. 4). As another example, the predetermined time interval or predetermined number of fuel tank pressure measurements may be set large enough to reliably measure a rate of change in fuel tank pressure due to a refueling event.

Next, method 200 continues at 214 where it determines if a first refuel criterion is satisfied. The first refuel criterion may include the rate of change in FTP being greater than a first threshold. The rate of change may be determined from FTP data collected over a threshold time within the predetermined time interval. For example, refueling may cause FTP to fluctuate as fuel is dispensed into the fuel tank, and the rate of change in FTP may be increased momentarily as fuel is pumped into the fuel tank. Furthermore, as more fuel is added to the fuel tank, the flow rate of fuel added to the tank may pulsate causing FTP and the rate of change in FTP to increase and decrease. Determining the rate of change in FTP over a threshold time longer than a pulsing cycle of the refueling flow rate may be performed to reliably detect a refueling event.

The first refuel criterion may further include FTP being greater than a third threshold over the predetermined period of time interval. For example, refueling may cause FTP to increase as fuel is added to the fuel tank. Accordingly, if the rate of change in FTP is greater than a first threshold, and FTP increases above a third threshold during a predetermined time interval, then the first refuel criterion may be satisfied. As an example, the third threshold may be a fuel tank pressure of 0.5 in $H_2O$. As a further example, first refuel criterion may further include FTP being greater than atmospheric pressure.

If the first refuel criterion is satisfied, method 200 continues at 220, where it is determined if CVV 114 is open. If CVV 114 is open, method 200 closes CVV 114 at 230. After closing CVV 114, method 200 monitors the fuel tank pressure at 240. Monitoring the fuel tank pressure at 240 may be similar to monitoring the fuel tank pressure at 210, wherein monitoring FTP may include receiving signals from fuel tank pressure sensor 121 over a predetermined time interval such that a predetermined number of fuel tank pressure measurements can be performed.

Returning to 220, if CVV is closed, then method 200 continues directly to 250 from 220. Otherwise, method 200 continues to 250 from 240, where it determines if a second refuel criterion is satisfied. The second refuel criterion may include the rate of change in FTP being greater than a second threshold, wherein the second threshold is greater than the first threshold. The second threshold may be greater than the first threshold because when CVV 114 is closed, the rate of change in FTP due to refueling may increase as compared to when CVV 114 is open. As a further example, the second fuel tank pressure criterion may further include FTP being greater than a fourth threshold, wherein the fourth threshold is greater than the third threshold. The fourth threshold may be greater than the third threshold because when CVV 114 is closed, FTP may increase due to refueling by a greater amount as compared to when CVV 114 is open. For example, the second criterion may be satisfied when a rate of change in FTP is greater than a second threshold and when FTP is greater than a fourth threshold over the predetermined time interval. As a further example, the fourth threshold may be 4 in $H_2O$.

If the second refuel criterion is satisfied, then method 200 continues at 260, where a refueling event indication is provided. For example, a refueling flag may be set to 1, indicating that an engine-off refueling event has been performed. Upon restarting the engine, a refueling indication may be provided to the vehicle operator. As a further example, the refueling indication may also be provided to a vehicle adaptive fuel strategy, or may be provided to update a dashboard instrument cluster display at the next engine-on condition. After providing a refueling indication at 260, the CVV 114 is opened at 270. Opening CVV 114 allows for vapor in the fuel tank to be purged as fuel is dispensed during refueling into the fuel tank 20. Purged fuel tank vapors first pass through canister 22 prior to exiting via CVV 114 at vent 27 so that fuel vapors can be stripped in the canister 22 reducing pollution. Opening CVV 114 may also reduce a pressure increase resulting from the refueling and thus help avoid a premature shutoff of the refueling pump.

In this manner, a refueling event may be detected during engine-off diagnostic leak detection testing conditions when CVV 114 is open or closed. For example, if CVV 114 is open when refueling is started, then FTP may increase more slowly or by a smaller amount as compared to when refueling is started when CVV 114 is closed. By evaluating a first refuel criterion when CVV 114 is open, and evaluating a second refuel criterion when CVV 114 is closed, a refueling event can be reliably determined.

Returning to method 200 at 214, if the first refuel criterion is not satisfied, then method 200 continues at 216 where the diagnostic leak detection test is completed. After 216, method 200 ends. Next, returning to method 200 at 250, if the second refuel criterion is not satisfied, then method 200 continues at 256 where an FTP sensor noise test may be performed to determine if fluctuations in FTP detected at 210 and 214 may be due to FTP sensor 121 noise. For example, if the first refuel criterion is satisfied when the CVV 114 is open but the second refuel criterion is not satisfied when the CVV 114 is closed, it may be determined that fluctuations in FTP measurements may be caused by FTP sensor noise rather than a refueling event. As an example, a noise test may include determining if fluctuations in FTP increase in response to closing CVV 114 above a noise threshold. For example, the noise threshold may include a percentage increase in FTP fluctuation amplitude in response to CVV 114 being closed. A noise threshold may further include a frequency threshold in FTP measurements. For example, if fluctuations in FTP are measured higher than a threshold frequency, it may be determined that the FTP sensor is noisy. Further known example methods of sensor noise testing may be used.

If it is determined that FTP sensor signal is noisy, then method 200 continues from 258 at 280 where it aborts the diagnostic leak detection test. As described above, aborting an engine-off diagnostic leak detection test may comprise one or more of opening CPV 112 and/or opening CVV 114, setting a diagnostic leak detection test abortion flag, and repeating or restarting the diagnostic leak detection test after a predetermined wait time. Method 200 may also continue at 280 from 270. In this manner, method 200 aborts the diagnostic leak detection test if a refueling event is indicated at 260, or if the FTP sensor is noisy. In either case, a reliable diagnostic leak detection test may not be performed. If at 258, the FTP sensor is not noisy, then method 200 continues at 216, where it completes the diagnostic leak detection test. In this manner, method 200 completes the diagnostic leak detection test when a refueling event is not detected and when the FTP sensor is not noisy. After 216 and 280, method 200 ends.

In this way, a method for an engine fuel system may comprise during an engine-off condition, indicating a refueling event based on a rate of change in fuel tank pressure, and aborting a diagnostic leak detection test based on the refueling event indication, wherein the rate of change in fuel tank pressure is measured by a fuel tank pressure sensor, and wherein the rate of change in fuel tank pressure may be measured over a threshold time. Aborting the diagnostic leak detection test may include opening a canister purge valve and/or opening the canister vent valve, setting a diagnostic leak detection test abortion flag and repeating the diagnostic leak detection test.

Indicating the refueling event may be based on the rate of change in fuel tank pressure being greater than a first threshold when a canister vent valve is open, and greater than a second threshold when the canister vent valve is closed, the first threshold being less than the second threshold. Furthermore, the canister vent valve may be closed in response to the rate of change in fuel tank pressure being greater than the first threshold when the canister vent valve is open. Indicating the refueling event may be further based on a fuel tank pressure being greater than a third threshold when the canister vent valve is open, and on a fuel tank pressure being greater than a fourth threshold when the canister vent valve is closed, the third threshold being less than the fourth threshold. The third threshold may be 0.5 inches of water, and the fourth threshold may be 4 inches of water. The refueling event indication may further be provided to a vehicle operator and/or an adaptive fuel strategy during a next engine-on condition.

The method may further comprise opening the canister vent valve in response to the rate of change in fuel tank pressure being higher than the second threshold, and completing the diagnostic leak detection test in response to the rate of change in fuel tank pressure being less than the first threshold when the canister vent valve is open. In response to the rate of change in fuel tank pressure being less than the second threshold when the canister vent valve is closed, a fuel tank pressure sensor noise test may be conducted. Furthermore, the diagnostic leak detection test may be completed in response to a fuel tank pressure sensor noise being less than a noise threshold. In response to the fuel tank pressure sensor noise being greater than the noise threshold, the diagnostic leak detection test may be aborted.

A method for a vehicle having a fuel tank pressure sensor, a fuel vapor canister, and a canister vent valve may comprise during an engine-off vapor leak test, measuring a fuel tank pressure with the fuel tank pressure sensor, and in response to a rate of change in fuel tank pressure being greater than a second threshold when the canister vent valve is closed, aborting the engine-off vapor leak test. The method may further comprise determining if the rate of change in fuel tank pressure is greater than a first threshold when the canister vent valve is open, the first threshold being less than the second threshold, and in response to the rate of change in fuel tank pressure being greater than the first threshold, closing the canister vent valve. Further still, the method may comprise opening the canister vent valve in response to the rate of change in fuel tank pressure being greater than the second threshold when the canister vent valve is closed.

A method of providing a refueling indication in a vehicle may comprise during a first condition when an engine is off and while a diagnostic leak detection test is being carried out, measuring a fuel tank pressure, in response to a rate of change in fuel tank pressure being greater than a first threshold, closing a canister vent valve, and in response to the rate of change in fuel tank pressure being greater than a second threshold, opening the canister vent valve, setting a refueling event flag on, and aborting the diagnostic leak detection test. The method may further comprise storing the refueling event flag and providing the stored refueling event flag to a vehicle operator and/or adaptive fuel strategy during a next engine-on condition following the first condition.

Turning now to FIG. 3, it illustrates a timeline 300 for detecting a refueling event during an engine-off diagnostic leak detection test. In particular, timeline 300 depicts trends of engine status 310, leak detection status 318, CPV status 322, CVV status 320, FTP 330, rate of change in FTP 340, and refuel event flag 350. Furthermore, a first threshold 346 and a second threshold 344 corresponding to FTP rate of change thresholds, and a third threshold 336 and a fourth threshold 334 corresponding to FTP thresholds, are shown. As shown in FIG. 3, first threshold 346 may less than second threshold 344, and third threshold 336 may be less than fourth threshold 334.

At t0, during an engine-off condition, diagnostic leak detection testing status may be turned on. In response to starting diagnostic leak detection testing, CPV 112 may be closed (CPV status 322) at t0 to isolate the fuel system. During a time after t0 and prior to t1, the engine status 310 is off and a leak detection status 318 is on. Prior to t1, CVV status 320 is open, FTP and the rate of change in FTP are smaller than the third threshold 336 and first threshold 446 respectively, and diagnostic leak detection testing proceeds without interruption. At t1, refueling is started, the rate of change in FTP 340 begins to increase and exceeds a first threshold 346, and FTP 330 increases above a third threshold 336. In response to the rate of change in FTP and FTP exceeding a first threshold 346 and a third threshold 336 respectively, the first refuel criterion of method 200 is satisfied, and CVV 114 is closed at t2. After closing CVV 114 at t2, the rate of change in FTP 340 exceeds a second threshold 344, and FTP 330 exceeds fourth threshold 334. Accordingly, the second refuel criterion of method 200 is satisfied, a refueling event is detected, and the refuel event flag 350 is set to 1 at t3. Subsequently, in response to detecting a refueling event, and the diagnostic leak detection test is aborted. Aborting the diagnostic leak detection test may include opening CPV 112, opening CVV 114, and changing leak detection status 318 to off. As described above, aborting the diagnostic leak detection test may further include setting a diagnostic leak detection test abortion flag and repeating the diagnostic leak detection test after a predetermined wait time.

Turning now to FIG. 4, it illustrates an example plot 400 of measurements in FTP 410 during refueling with CVV status 430. FIG. 4 also depicts a third threshold 440 of 0.5 in $H_2O$ and fourth threshold 420 of 4 in $H_2O$. When CVV status 430 is open, fluctuations in FTP during refueling increase above the third threshold 440 but remain less than the fourth threshold 420. On the other hand, when CVV status 430 is closed, fluctuations in FTP during refueling consistently increase above the fourth threshold 420. Accordingly, in this example, setting a third threshold to 0.5 in $H_2O$ and setting a fourth threshold to 4 in $H_2O$ may aid in reliably detecting a refueling event during an engine-off diagnostic leak detection test.

As will be appreciated by one of ordinary skill in the art, routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, non-hybrid vehicles, and vehicles with I3, I4, I5, V6, V8, V10, and V12 engines operating in natural gas, gasoline, diesel, or alternative fuel configurations could use the present description to advantage.

The invention claimed is:

1. A method for an engine fuel system, comprising:

during an engine-off condition, indicating a refueling event based on a rate of change in fuel tank pressure being greater than a first threshold when a canister vent valve is open, and greater than a second threshold when the canister vent valve is closed, the first threshold being less than the second threshold; and aborting a diagnostic leak detection test based on the refueling event indication.

2. The method of claim 1, further comprising closing the canister vent valve in response to the rate of change in fuel tank pressure being greater than the first threshold when the canister vent valve is open.

3. The method of claim 1, wherein the rate of change in fuel tank pressure is measured by a fuel tank pressure sensor.

4. The method of claim 2, further comprising opening the canister vent valve in response to the rate of change in fuel tank pressure being higher than the second threshold.

5. The method of claim 1, further comprising completing the diagnostic leak detection test in response to the rate of change in fuel tank pressure being less than the first threshold when the canister vent valve is open.

6. The method of claim 2, further comprising performing a fuel tank pressure sensor noise test in response to the rate of change in fuel tank pressure being less than the second threshold when the canister vent valve is closed.

7. The method of claim 6, further comprising completing the diagnostic leak detection test in response to a fuel tank pressure sensor noise being less than a noise threshold.

8. The method of claim 7, further comprising aborting the diagnostic leak detection test in response to the fuel tank pressure sensor noise being greater than the noise threshold.

9. The method of claim 1, wherein the rate of change in fuel tank pressure is measured over a threshold time, and wherein aborting the diagnostic leak detection test includes opening a canister purge valve and/or opening the canister vent valve.

10. The method of claim 9, wherein aborting the diagnostic leak detection test further comprises setting a diagnostic leak detection test abortion flag and repeating the diagnostic leak detection test.

11. The method of claim 1, wherein indicating the refueling event is further based on a fuel tank pressure being greater than a third threshold when the canister vent valve is open, and greater than a fourth threshold when the canister vent valve is closed, the third threshold being less than the fourth threshold.

12. The method of claim 11, wherein the third threshold is 0.5 inches of water.

13. The method of claim 11, wherein the fourth threshold is 4 inches of water.

14. The method of claim 1, wherein the refueling event indication is provided to a vehicle operator and/or an adaptive fuel strategy during a next engine-on condition.

15. A method for a vehicle having a fuel tank pressure sensor, a fuel vapor canister, and a canister vent valve, comprising:

during an engine-off vapor leak test, measuring a fuel tank pressure with the fuel tank pressure sensor;

in response to a rate of change in fuel tank pressure being greater than a second threshold when the canister vent valve is closed, aborting the engine-off vapor leak test;

determining if the rate of change in fuel tank pressure is greater than a first threshold when the canister vent valve is open, the first threshold being less than the second threshold; and in response to the rate of change in fuel tank pressure being greater than the first threshold, closing the canister vent valve.

16. The method of claim 15, further comprising opening the canister vent valve in response to the rate of change in fuel tank pressure being greater than the second threshold when the canister vent valve is closed.

17. A method of providing a refueling indication in a vehicle, comprising:

during a first condition when an engine is off and while a diagnostic leak detection test is being carried out, measuring a fuel tank pressure;

in response to a rate of change in fuel tank pressure being greater than a first threshold, closing a canister vent valve; and in response to the rate of change in fuel tank pressure being greater than a second threshold, opening the canister vent valve, setting a refueling event flag on, and aborting the diagnostic leak detection test.

18. The method of claim 17, further comprising storing the refueling event flag and providing the stored refueling event flag to a vehicle operator and/or adaptive fuel strategy during a next engine-on condition following the first condition.

* * * * *